J. W. HAYS.
GAS ANALYZING APPARATUS.
APPLICATION FILED JULY 3, 1912.
1,077,342.
Patented Nov. 4, 1913.
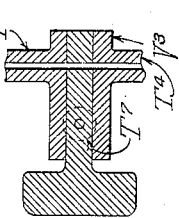
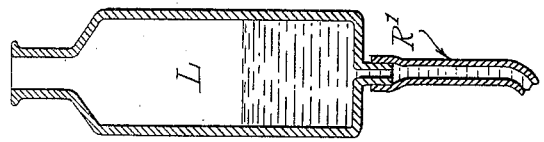
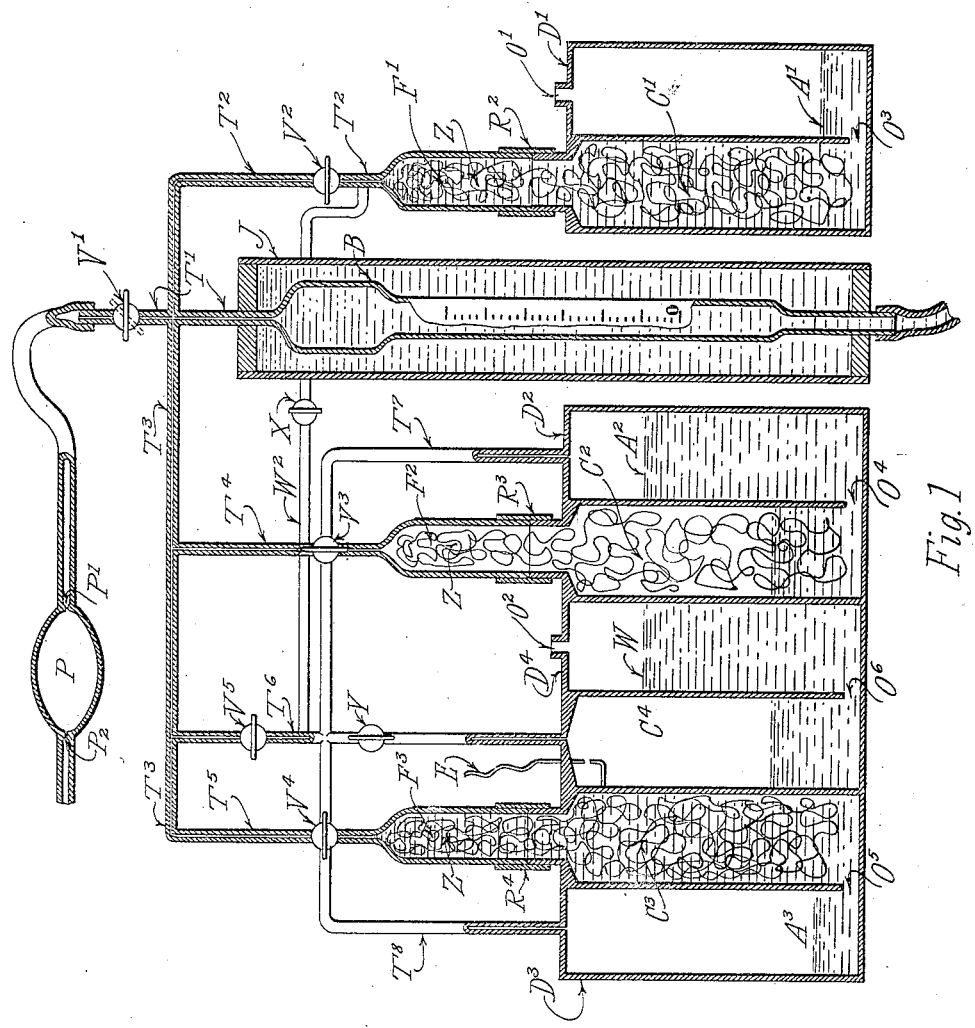
WITNESSES:
Marcella Greene.
Chas. W. Hays
INVENTOR
Joseph W. Hays.

UNITED STATES PATENT OFFICE.

JOSEPH W. HAYS, OF CHICAGO, ILLINOIS.

GAS-ANALYZING APPARATUS.

1,077,342.   Specification of Letters Patent.   Patented Nov. 4, 1913.

Application filed July 3, 1912. Serial No. 707,647.

*To all whom it may concern:*

Be it known that I, JOSEPH W. HAYS, a citizen of the United States, residing in the city of Chicago, county of Cook, and State of Illinois, have invented certain new and useful Improvements in Gas-Analyzing Apparatus, of which the following is a specification.

The invention relates especially to apparatus designed to determine several or all of the constituents of a gaseous mixture, such as for instance escaping furnace gases, illuminating gas, producer gas and the like.

The invention consists principally of the novel means employed to secure speed in absorption, convenience in operation and protection of the absorber liquids from the oxidizing influences of the air.

In my application for patent upon "instruments for the analysis of gases," Serial Number 410,549, I claimed certain novelties in connection with the absorber chambers and the means of introducing the liquids into same. In my application for patent upon "gas absorption apparatus", Serial Number 564,746, I claimed certain improvements designed to protect the absorber liquids from contact with the air. The present invention embodies certain additional improvements since the filing of the above mentioned applications.

I attain the objects of my invention by the means illustrated in the accompanying drawings, in which similar letters and figures refer to similar parts throughout.

Figure 1 illustrates an assembled view of the entire apparatus, principally in cross-section. Fig. 2 shows one of the cocks or valves in cross-section.

In Fig. 1, "B" is a gas measuring burette, surrounded by a water-jacket, "J", and connected at the bottom by means of a flexible tube with the leveling bottle, "L".

"$C^1$", "$C^2$" and "$C^3$" are vessels containing absorbers and are connected at "$O^3$", "$O^4$" and "$O^5$" respectively with the displacement chambers, "$D^1$", "$D^2$" and "$D^3$". The liquids "$A^1$", "$A^2$" and "$A^3$" are absorbers for different gases, as for example, carbon dioxid, oxygen and carbon monoxid.

"$C^4$" is a container for water and "$D^4$" a displacement vessel connected therewith by the opening, "$O^6$" and having an air vent, "$O^2$" as shown.

Connected with the absorber vessels by means of the rubber couplings, "$R^2$", "$R^3$" and "$R^4$" are the inverted glass funnels, "$F^1$", "$F^2$" and "$F^3$". These funnels lead into the capillary tubes, "$T^2$", "$T^4$" and "$T^5$",—the latter being furnished respectively with the valves "$V^2$", "$V^3$" and "$V^4$". "$T^7$" is connected with the displacement vessel, "$D^2$" and leads through valve "$V^3$". "$T^8$" is connected with the displacement vessel, "$D^3$" and leads through "$V^4$". Valves "$V^3$" and "$V^4$" are of similar construction and as illustrated in Fig. 2. The capillary tubes, "$T^2$" and "$T^3$" are connected by means of a cross with the capillary tube of the burette, "B" as shown. Tube "$T^3$" is connected with the tubes "$T^4$" and "$T^5$", also with "$T^6$" which is furnished with valve, "$V^5$" and connects with "$T^9$" at its T connection with "$T^7$" and "$T^8$". "$T^1$" is provided with the valve, "$V^1$" and is connected by flexible tube with the pump, "P",—the latter being provided with the "push" and "pull" valves, "$P^1$" and "$P^2$". "$V^2$" and "$V^5$" are ordinary stopcocks. "$V^1$" is an ordinary stopcock provided with an air vent, the latter being open to the atmosphere when the handle of the cock is in the oblique position as shown by the dotted lines.

"$W^2$" is a capillary tube connecting "$T^6$" with the capillary tube of funnel, "$F^1$".

"X" and "Y" are ordinary stopcocks.

In each of the absorber chambers and the funnels connected therewith is a filter composed of wire, steel wool, glass wool or any suitable substance. The object of this filter, "Z" is to provide large absorption surface and "break up" the gas as it flows into the absorption chambers.

The construction of the valves, "$V^3$" and "$V^4$" is such that when the valve is in the open position as shown for "$V^3$", communication will be established between "$C^2$" and "B" through the tubes "$T^4$" and "$T^3$" and also between "$D^2$" and "$C^4$" through the tubes "$T^7$" and "$T^9$". The valve, "$V^4$", in similar manner opens and closes communication between "$C^3$" and "B" and simultaneously between "$D^3$" and "$C^4$".

"E" is a jump spark electrode and its function will be explained later.

The apparatus is operated as follows: The jacket, "J" is first filled with clear water, which should completely surround the burette, "B." The leveling bottle, "L," is about two thirds filled with mercury, light oil or water. Assuming that the gases to be determined are carbon dioxid, oxygen, carbon monoxid, hydrogen and methane, the absorbers employed would be as follows: For carbon dioxid, a strong solution of caustic potash in container, "$C^1$." For oxygen, an alkaline solution of pyrogallic acid in container, "$C^2$." For carbon monoxid, a solution, preferably ammoniacal, of cuprous chlorid, in container "$C^3$." Container, "$C^4$" is filled with water. The liquids are all drawn up into the capillary tubes above the container chambers by means of the leveling bottle. This is accomplished as follows: The valve, "$V^1$" is first placed in such position that the air vent referred to is open. The leveling bottle is then raised, whereupon water flows into "B" from "L" and fills same, the air being driven out through the vent referred to. "$V^1$" is then closed, "$V^2$" opened and the leveling bottle lowered, whereupon the solution in "$C^1$" is raised to the desired height. In like manner the other liquids are raised to the points desired by opening the necessary valves and using the leveling bottle. The apparatus is now ready for the work of analysis, which is performed as follows: The pump, "P" is connected by means of a rubber tube, or otherwise, with the source of gas to be analyzed, "$V^1$" is opened and the pump, "P" worked with the hand, whereupon gas is pumped into "B," displacing the water therein and bubbling out through the leveling bottle. "L" is next raised, whereupon the water rises in "B," expelling some of the gas. "$V^1$" is closed when the water reaches the zero mark. The gas has now been measured at atmospheric pressure and at the temperature of the water in jacket "J," surrounding the burette. "$V^2$" is next opened, whereupon the gas flows from "B" into "$C^1$," the leveling bottle being raised in order to force it all over. As the gas is passed over into "$C^1$," the absorber solution, "$A^1$," is displaced through "$O^3$" into the displacement chamber, "$D^1$." The filter, "Z," is left wet with this solution as the liquid descends. The gas flows in over the wet fibers or wires of the filter and the carbon dioxid is immediately and completely absorbed. The gas is next returned to the burette, being pulled back by lowering the leveling bottle. "$V^2$" is closed when the liquid, "$A^1$" reaches the capillary tube immediately below "$V^2$." The leveling bottle is then held in such position that the level of the water therein is in the same horizontal plane as the surface of the water in "B." The percentage of $CO_2$, which is the percentage of the contraction of the gas sample is read off upon the scale of the burette. This scale, which it has been difficult to show in the drawing, is etched upon the glass tube, "B." It is a common practice to stand glass tubes in the absorption vessels of gas analysis instruments, or to fill such vessel with glass beads, broken quartz or other substances to provide absorption surface. There are several objections to the glass tubes, viz. The tubes do not provide sufficient surface to insure rapid absorption, they do not serve the office of mixing the gas as it flows into the absorption chamber and unless considerable care is exercised the liquid will be displaced from some of the tubes faster than from others and this is liable to result in some of the gas being bubbled over from the absorption to the displacement chamber, thereby spoiling the analysis. The use of beads or other substances is objectionable on account of the bulk of same and also on account of the fact that gas bubbles are liable to be trapped among the beads, thereby rendering the analysis inaccurate. I have found the use of a fibrous filter highly satisfactory. A very large surface is exposed and the gas is thoroughly mixed or "cut to pieces" as it flows into the absorption vessel. This renders absorption extremely rapid. Steel wool makes an admirable filter for this purpose and a fine wire when properly packed is quite satisfactory. I have found that a complete absorption of $CO_2$ can be obtained on five seconds' exposure where this filter is employed, whereas with the glass tubes an exposure of from three to five minutes is necessary. After the absorption of $CO_2$, the oxygen should next be removed. To accomplish this the residue of the gas sample is passed into "$C^2$" by turning "$V^2$" to the open position shown in the drawing and raising the leveling bottle. "$A^2$" is displaced into "$D^2$," in turn displacing the air therein, which flows through "$T^7$" and "$T^9$" into "$C^4$," displacing the water contained therein into "$D^4$." The gas is then returned to "B," whereupon the liquids, "$A^2$" and "W" are drawn back to their normal positions. The resulting contraction is read off on the scale of the burette and this is the percentage of oxygen. In like manner the percentage of CO is determined by passing the residue into "$C^3$," manipulating as described for the absorption of oxygen.

The liquids "$A^2$" and "$A^3$" are both oxygen absorbers and deteriorate very rapidly on exposure to air. The function of the water seal in "$C^4$" and "$D^4$" is to prevent contact with the air and thus avoid spoiling the solutions. Rubber bags are employed sometimes on gas analysis instruments for this purpose. They are very unsatisfactory owing to the fact that the rubber will be affected by the fumes from the solutions and if not so affected will deteriorate rapidly and in a short time become unsuitable for use.

If it is desired to determine the percentages of hydrogen and methane the gas residue after the CO absorption is passed into "C⁴". This is accomplished by opening "V⁵" and using the leveling bottle. A quantity of oxygen gas is then measured off in the burette and passed into "C⁴" following the gas. Proper connections are then made between the wires of the electrodes, "E" and a spark coil which is in turn connected with suitable batteries. Contact is made and the gas is ignited by the spark which leaps between the electrodes. The gas is then returned to the burette, measured and passed into the chamber "C¹" from whence it is again returned to the burette and remeasured. From the contraction following the explosion and that following exposure to the potash solution the percentages of hydrogen and methane are arrived at by well known formulas.

If desired the potash chambers, "C¹" and "D¹" may be employed for air sealing purposes in place of "C⁴" and "D⁴". To this end I have provided the tube "W²" and the valves or stop-cocks, "X" and "Y". If "Y" is closed and "X" opened the air will be displaced from "D²" into "C¹" when the gas is passed into "C²" and from "D³" into "C¹" when the gas is passed into "C³".

If it is not desired to analyze for hydrogen and methane, the parts, "C⁴", "D⁴", "T⁹", "E" and "Y" may be omitted altogether, the potash chambers and liquid serving the double purpose of carbon dioxid absorption and air seal during the process of absorbing oxygen and carbon monoxid.

The entire apparatus, except the tube, "R¹" and the pump, "P" may be made of glass if desired. All parts, excepting "B", "J", "L", "F¹", "F²" and "F³", which are necessarily of glass, may if desired be cast of metal.

I claim:

1. A gas analysis apparatus, consisting of a gas measuring burette; a leveling bottle connected with said burette; a multiplicity of absorption vessels, each having a displacement vessel connected with the bottom thereof, one of said displacement vessels being open to the air and the absorption vessel of said last mentioned displacement vessel being connected by tubes with each of said other displacement vessels; a stop cock in each of said tubes; a tube on said burette having a stop cock thereon; tubes connecting each of said absorption vessels with said burette and a stop cock on each of said tubes.

2. A gas analysis apparatus consisting of a gas measuring burette having a tube and a stop cock thereon; a leveling bottle connected with said burette; a multiplicity of absorption vessels, each connected by a tube having a stop cock thereon with said burette; a displacement vessel connected with the bottom of each of said absorption vessels and a fibrous packing filling each of said absorption vessels.

3. A gas analysis apparatus, consisting of a gas measuring burette having a tube and a stop cock thereon; a leveling bottle connected with said burette; a multiplicity of absorption vessels, each connected by a tube with said burette and each having a displacement vessel connected with the bottom thereof; a stop cock on each of said tubes; two vessels, adapted to contain a liquid and connected with each other near the bottoms thereof, the one chamber open at the top to the air and the other connected at the top by means of a tube with the top of each of said displacement vessels.

4. A gas analysis apparatus, consisting of a gas measuring burette having a tube connected at the top thereof with a stop cock thereon; a leveling bottle connected with said burette; a multiplicity of absorption vessels, each connected at the bottom thereof with a displacement vessel and each being connected by a tube with a stop cock thereon with said burette; a tube leading from each of said last mentioned stop cocks to each of said displacement vessels; a vessel adapted to contain a sealing liquid and a tube leading from said vessel to said last mentioned tube.

5. A gas absorption and liquid sealing apparatus for a gas analysis instrument consisting of an absorber vessel having a displacement vessel connected at the bottom thereof; a liquid container vessel connected at the bottom thereof with a displacement vessel open at the top to the atmosphere; a tube connecting said container vessel with said firstmentioned displacement vessel; a tube leading from the top of said absorber vessel to a gas measuring burette and a common valve in said tubes by means of which communication is simultaneously established between said absorber vessel and said burette and said container and said displacement vessel.

In witness whereof, I have hereunto set my hand and seal this 8th day of April, A. D., 1911.

JOSEPH W. HAYS. [L. S.]

Witnesses:
H. H. BABCOCK,
E. M. LORENZ.